US009267307B2

(12) United States Patent
St-Yves

(10) Patent No.: US 9,267,307 B2
(45) Date of Patent: Feb. 23, 2016

(54) TELESCOPING ARM WITH SECURABLE POLE-TILT ASSEMBLY

(71) Applicant: POSI-PLUS TECHNOLOGIES INC., Victoriaville (CA)

(72) Inventor: Jean-François St-Yves, Victoriaville (CA)

(73) Assignee: POSI-PLUS TECHNOLOGIES INC., Victoriaville (CA)

( * ) Notice: Subject to any disclaimer, the term of this patent is extended or adjusted under 35 U.S.C. 154(b) by 0 days.

(21) Appl. No.: 14/502,075

(22) Filed: Sep. 30, 2014

(65) Prior Publication Data

US 2015/0093217 A1   Apr. 2, 2015

Related U.S. Application Data

(60) Provisional application No. 61/884,372, filed on Sep. 30, 2013.

(51) Int. Cl.
*E04H 12/34* (2006.01)
*B25J 18/02* (2006.01)
*B25J 15/02* (2006.01)

(52) U.S. Cl.
CPC .............. *E04H 12/347* (2013.01); *B25J 15/024* (2013.01); *B25J 18/025* (2013.01)

(58) Field of Classification Search
CPC ... E04H 12/347; B25J 15/024; B25J 15/0213; B25J 18/025; E02F 3/4136; B66F 11/046
USPC .............. 414/10, 23, 732, 733, 745.2, 745.4, 414/745.5, 815
See application file for complete search history.

(56) References Cited

U.S. PATENT DOCUMENTS

| | | | |
|---|---|---|---|
| 3,116,840 A | 1/1964 | Carbert et al. | |
| 3,147,993 A * | 9/1964 | Broderson et al. | ............ 294/198 |
| 3,286,855 A | 11/1966 | Bill | |
| 3,628,675 A * | 12/1971 | Balogh | ........................... 414/23 |
| 3,631,991 A | 1/1972 | Wacht et al. | |
| 3,759,399 A | 9/1973 | Glass et al. | |
| 3,819,063 A | 6/1974 | Reimbold, Jr. | |
| 3,840,128 A * | 10/1974 | Swoboda et al. | ............. 414/728 |
| 4,212,577 A | 7/1980 | Swanson | |
| 6,592,316 B2 | 7/2003 | Hensler | |
| 7,588,403 B2 | 9/2009 | Symonds | |
| 2007/0166144 A1* | 7/2007 | Hall | .............. 414/732 |
| 2013/0216346 A1 | 8/2013 | Dodge, IV | |

* cited by examiner

*Primary Examiner* — Dean Kramer
(74) *Attorney, Agent, or Firm* — Goudreau Gage Dubuc; Hugh Mansfield

(57) ABSTRACT

A telescoping arm with securable pole-tilt assembly for manipulating a utility pole and comprising a pair of opposed jaws and a saddle, the arm comprising a boom and an elongate pin for selectively securing the pole tilt assembly in an operating position to the end of a telescoping boom section or in an out of operation position to an intermediate boom section wherein in the out of operation position the telescoping boom section can extend through the pole-tilt assembly and the elongate pin engages the jaws of the pole-tilt assembly preventing them from being articulated downwards towards the saddle, thereby preventing damage to the telescoping boom.

12 Claims, 8 Drawing Sheets

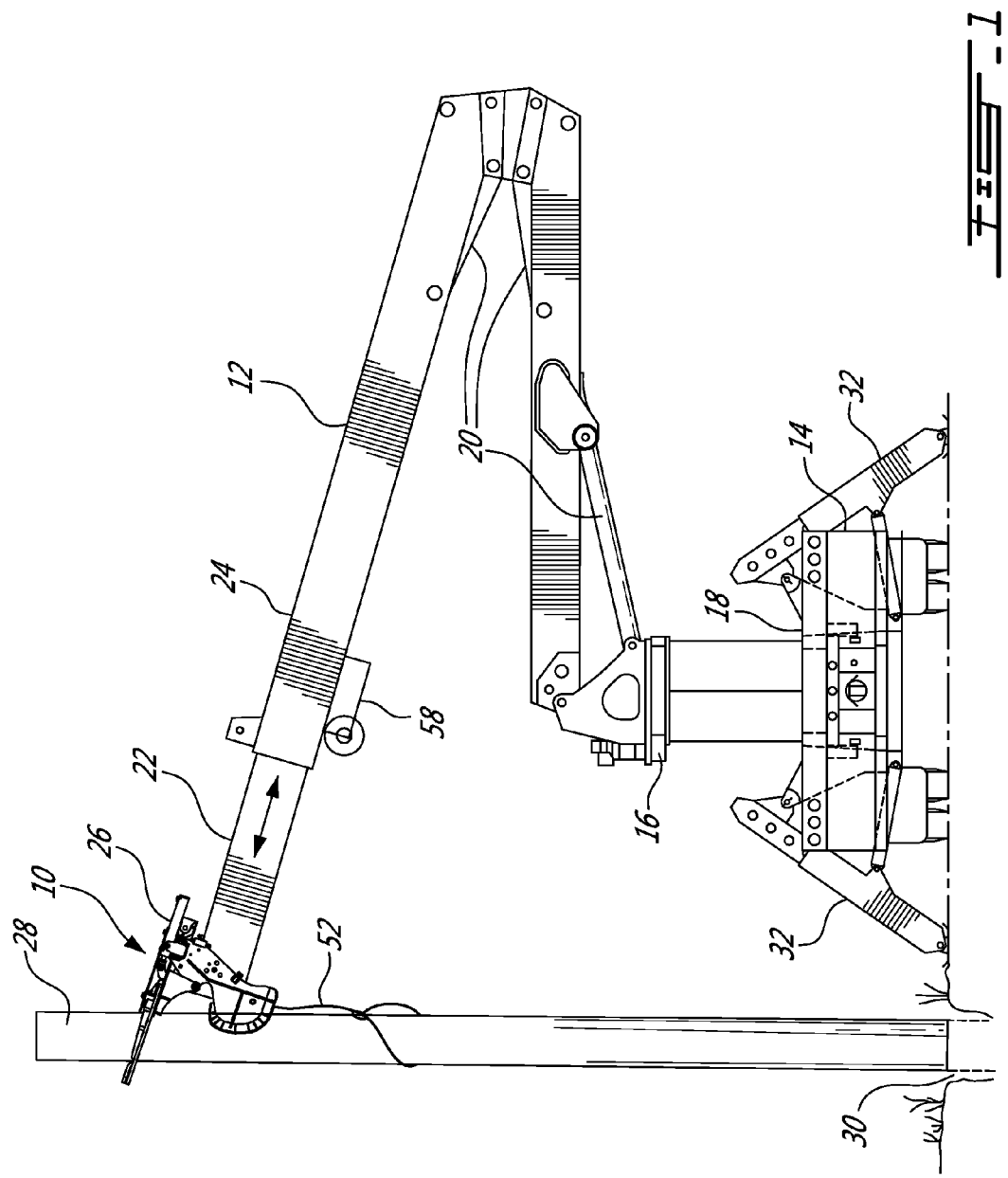

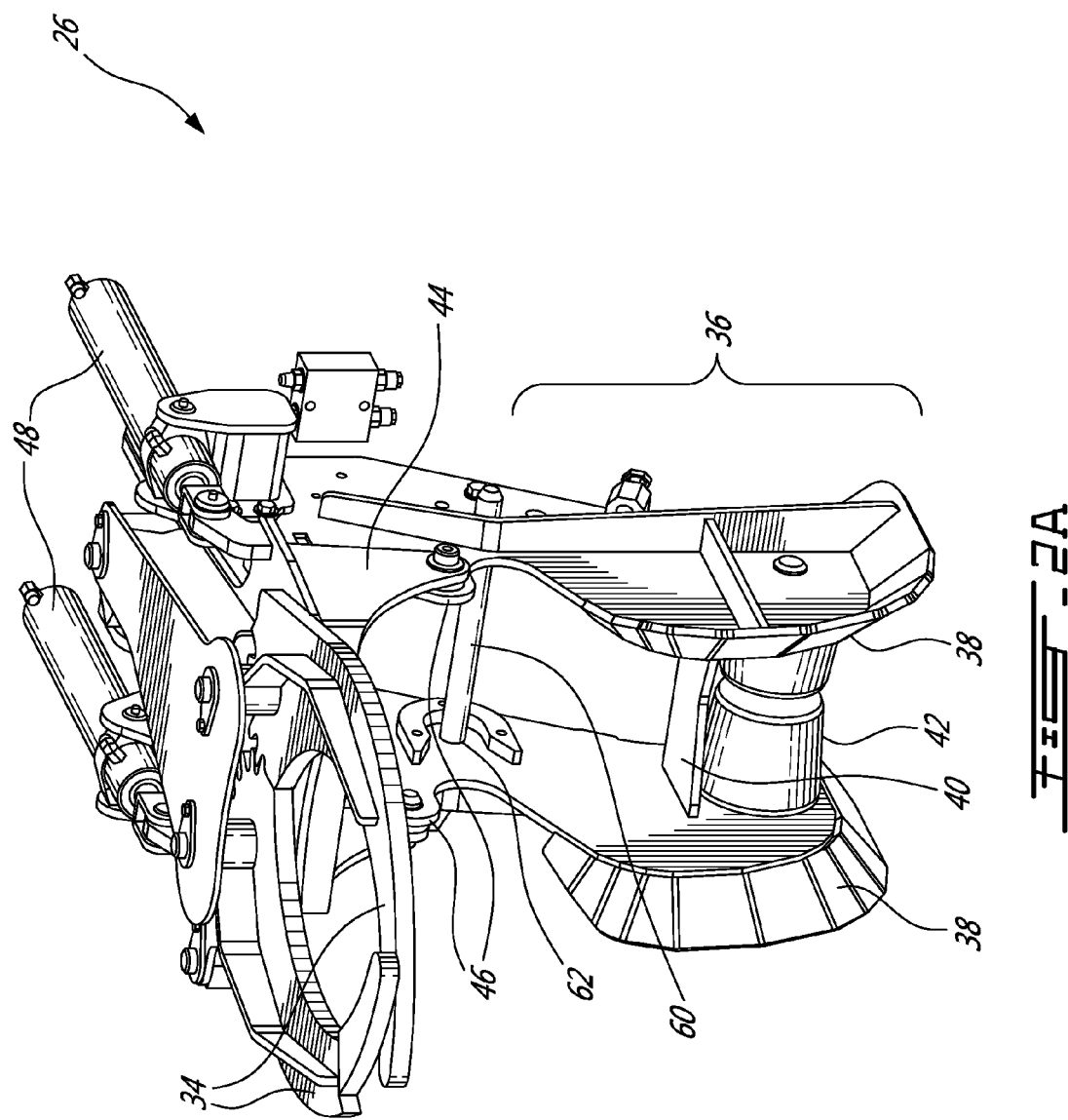

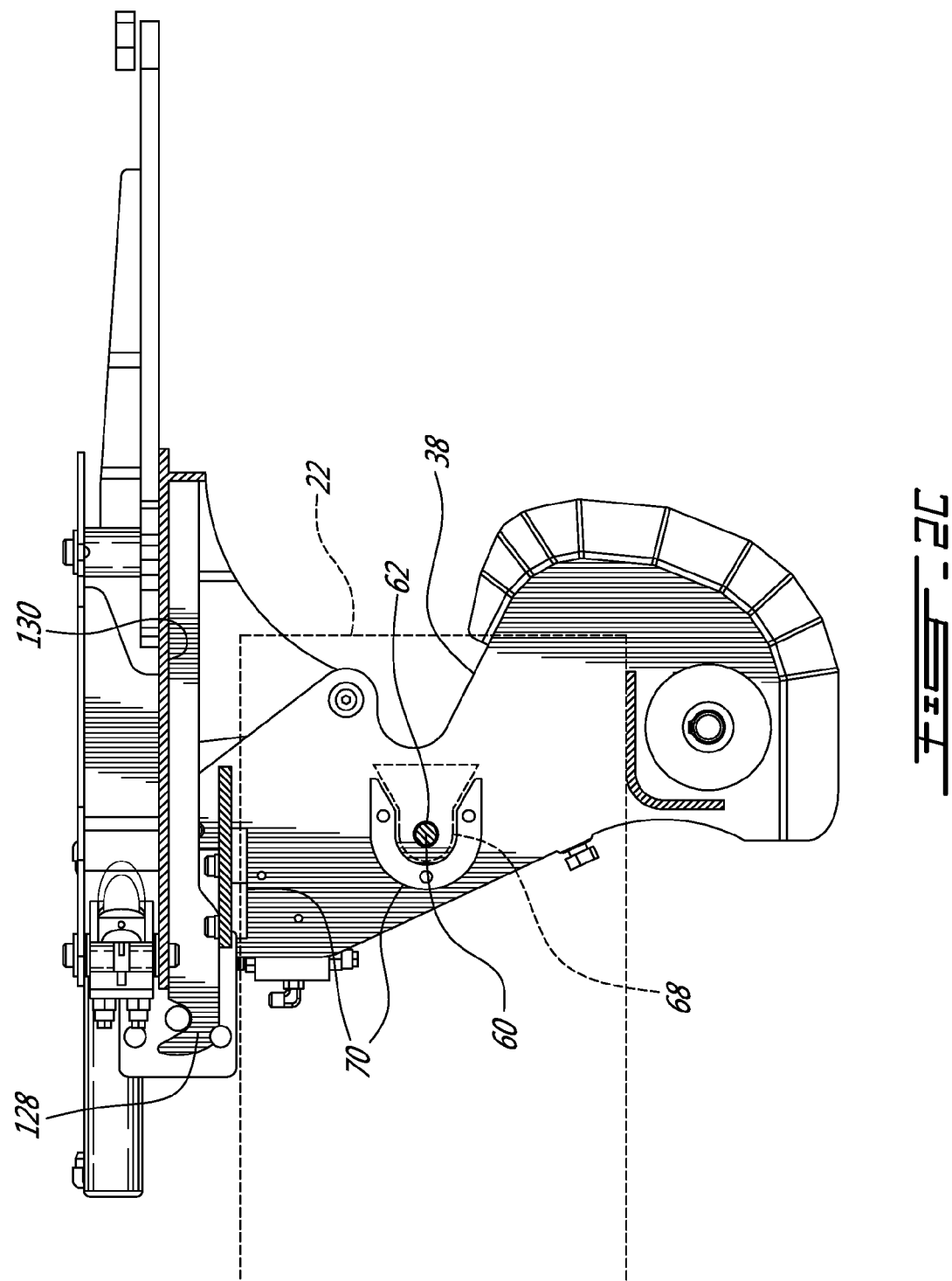

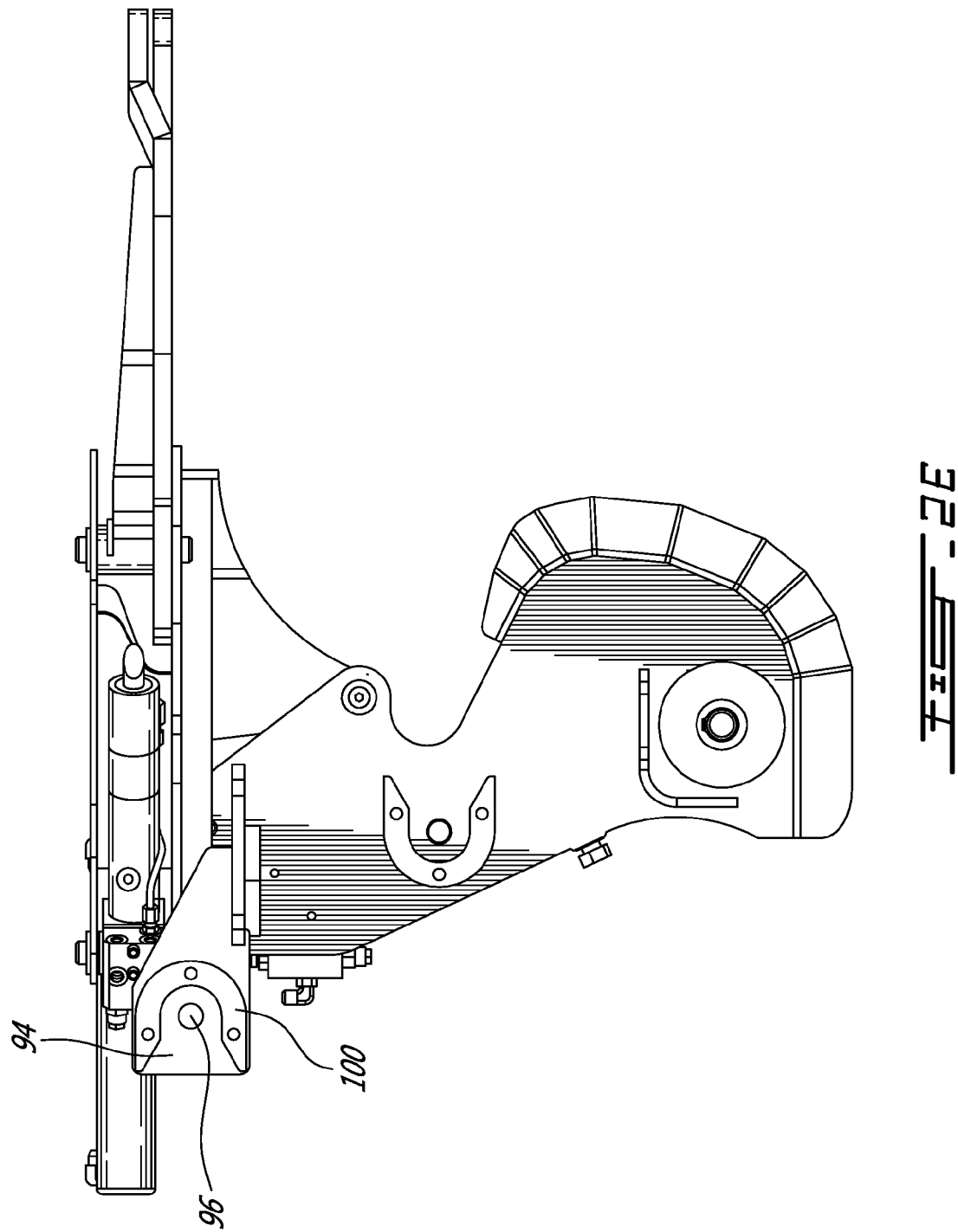

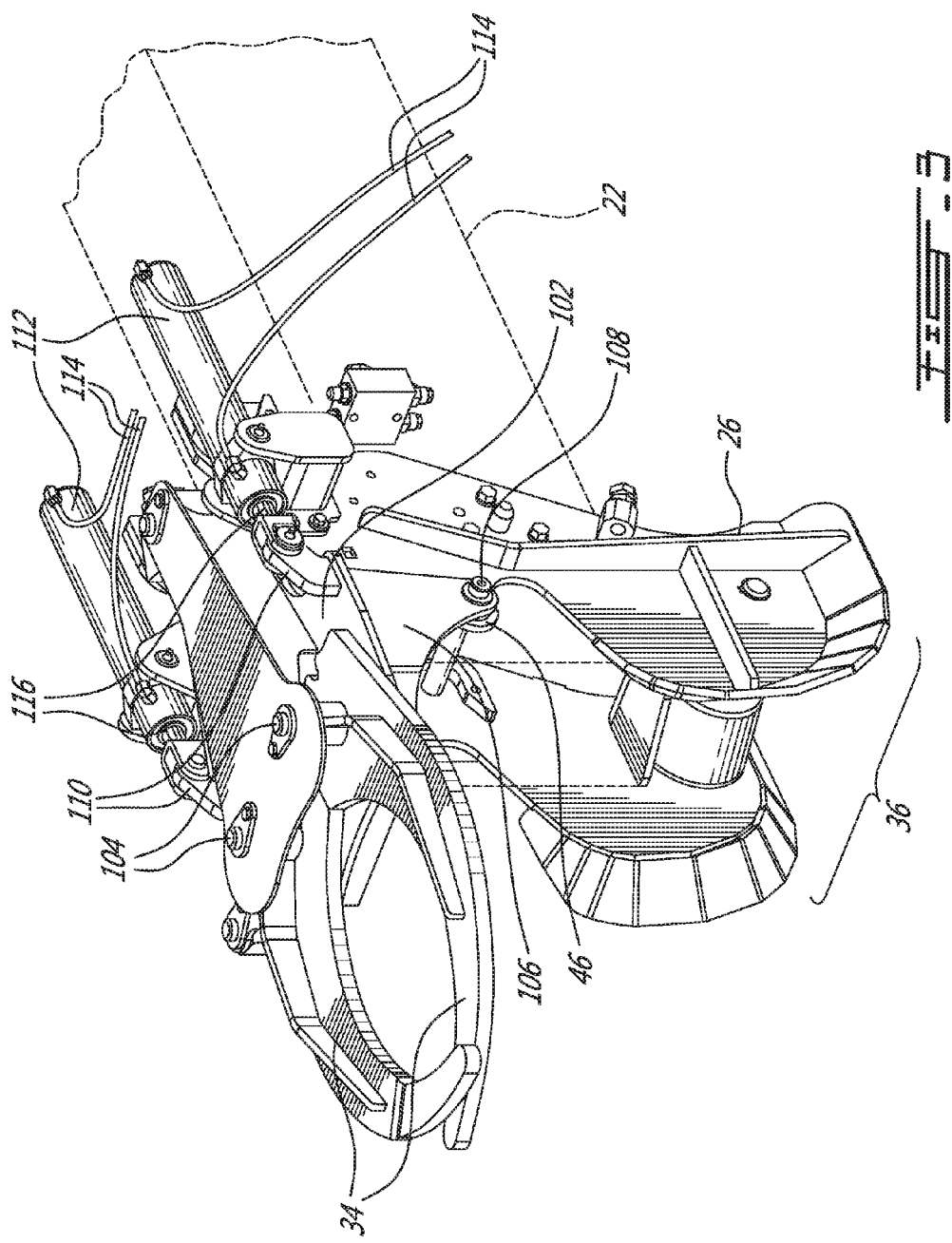

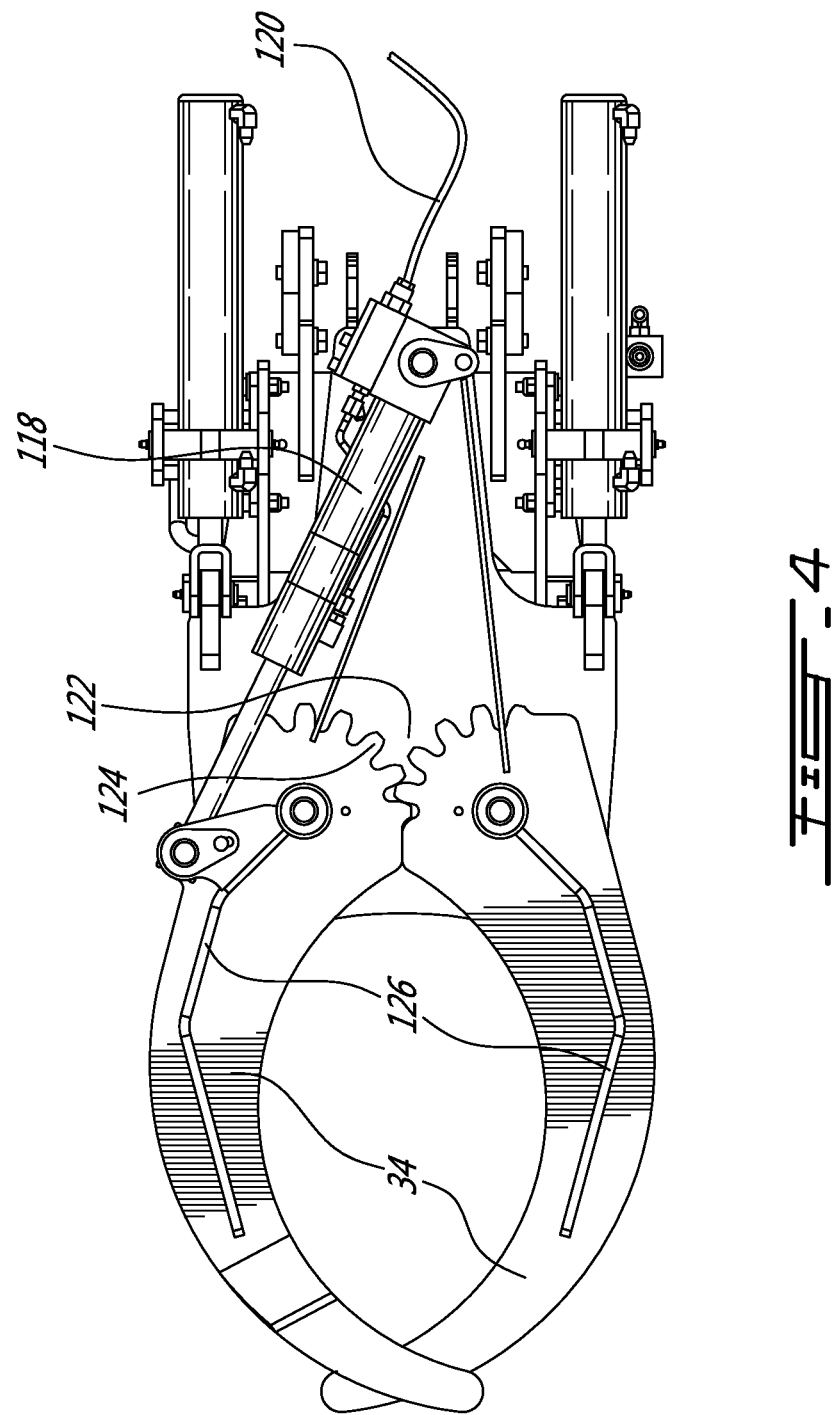

000
TELESCOPING ARM WITH SECURABLE POLE-TILT ASSEMBLY

CROSS REFERENCE TO RELATED APPLICATIONS

This application claims benefit under 35 U.S.C. §119(e), of U.S. provisional application Ser. No. 61/884,372, filed on Sep. 30, 2013. This document is incorporated herein in its entirety by reference.

FIELD OF THE INVENTION

The present invention relates to a telescoping arm with securable pole-tilt assembly. In particular, the present invention relates to a boom arm comprising a telescoping composite element and a pole handling mechanism which can be reliably secured when not in use.

BACKGROUND OF THE INVENTION

The prior art reveals telescoping arms comprising pole handling grabbers or sheaves. In some cases these sheaves are convertible and can be secured to the end of one or other of the segments depending on whether the sheave is in use or not in use. One drawback of some of these prior art systems is that the pole handling sheaves are moveable even when not in use and can inadvertently come into contact with the other telescoping section when extended. On booms manufactured with heavy steel this is typically not a problem. However, on telescoping booms for use on utility poles and the like, the final telescoping sections are often manufactured from non-conducting composites which, although capable of supporting considerable weight, are easily damaged.

SUMMARY OF THE INVENTION

In order to address the above and other drawbacks there is provided a telescoping arm with securable pole-tilt assembly for manipulating a utility pole. The assembly comprises a boom comprising an intermediate boom section and a telescoping boom section, the telescoping boom section fabricated from a non-conductive composite material and arranged for telescoping between a retracted and an extended position along a telescoping axis from within an outer end of the intermediate boom section, a pole-tilt assembly for receiving the utility pole along a pole axis and comprising a pole saddle and a jaw assembly comprising pair of opposed arcuate jaws each arranged to pivot about a respective axis and arranged for gripping the utility pole, the jaws positioned above the saddle along the pole axis and wherein the jaw assembly may be articulated relative to the saddle about an axis at right-angles to both the pole-axis and the telescoping axis, and a securing assembly comprising an elongate pin for selectively securing the pole saddle in one of either an operational position to an outer end of the telescoping section or in an out of operation position to the outer end of the intermediate boom section, wherein in the out of operation position the telescoping boom is configured for extension through the pole-tilt assembly between the jaw assembly and the pole saddle between the retracted and the extended position.

In the operational position a first pair of opposed apertures in the pole saddle align with a passageway in the telescoping boom section and such that the elongate pin can be inserted and retained within the first pair of apertures and the passageway and at right angles to the telescoping axis, wherein upon insertion of the pin through the first pair of apertures and the passageway the pole-tilt assembly is secured to the outer end of the telescoping boom section for movement therewith between the retracted and the extended position and wherein the jaw assembly may be articulated relative to the saddle, In the out of operation position a second pair of apertures in the pole saddle align with a third pair of apertures in the intermediate boom section and such that the elongate pin can be inserted and retained within the second and third pairs of apertures and at right angles to the telescoping axis, wherein upon insertion of the pin through the second and third pairs of apertures the pole-tilt assembly is secured to the outer end of the intermediate boom section, and further wherein the jaw assembly engages the pin thereby preventing the jaw assembly from being articulated downwards relative to the pole saddle.

BRIEF DESCRIPTION OF THE DRAWINGS

FIG. 1 is a plan view of a pole-tilt assembly mounted on an aerial boom assembly in accordance with an illustrative embodiment of the present invention;

FIG. 2A provides a left raised perspective view of a pole-tilt assembly in accordance with an illustrative embodiment of the present invention;

FIG. 2C is a cross section along lines IIC-IIC in FIG. 2B;

FIG. 2D is a right plan view from lines IID-IID in FIG. 2B;

FIG. 2E is a is a cross section along lines IIE-IIE in FIG. 2B;

FIG. 3 is a left raise perspective view of a pole-tilt assembly mount to the end of a telescoping arm and in accordance with an illustrative embodiment of the present invention; and FIG. 4 is a cross section along lines IV-IV in FIG. 2B.

DETAILED DESCRIPTION OF THE ILLUSTRATIVE EMBODIMENTS

Figure 2B:
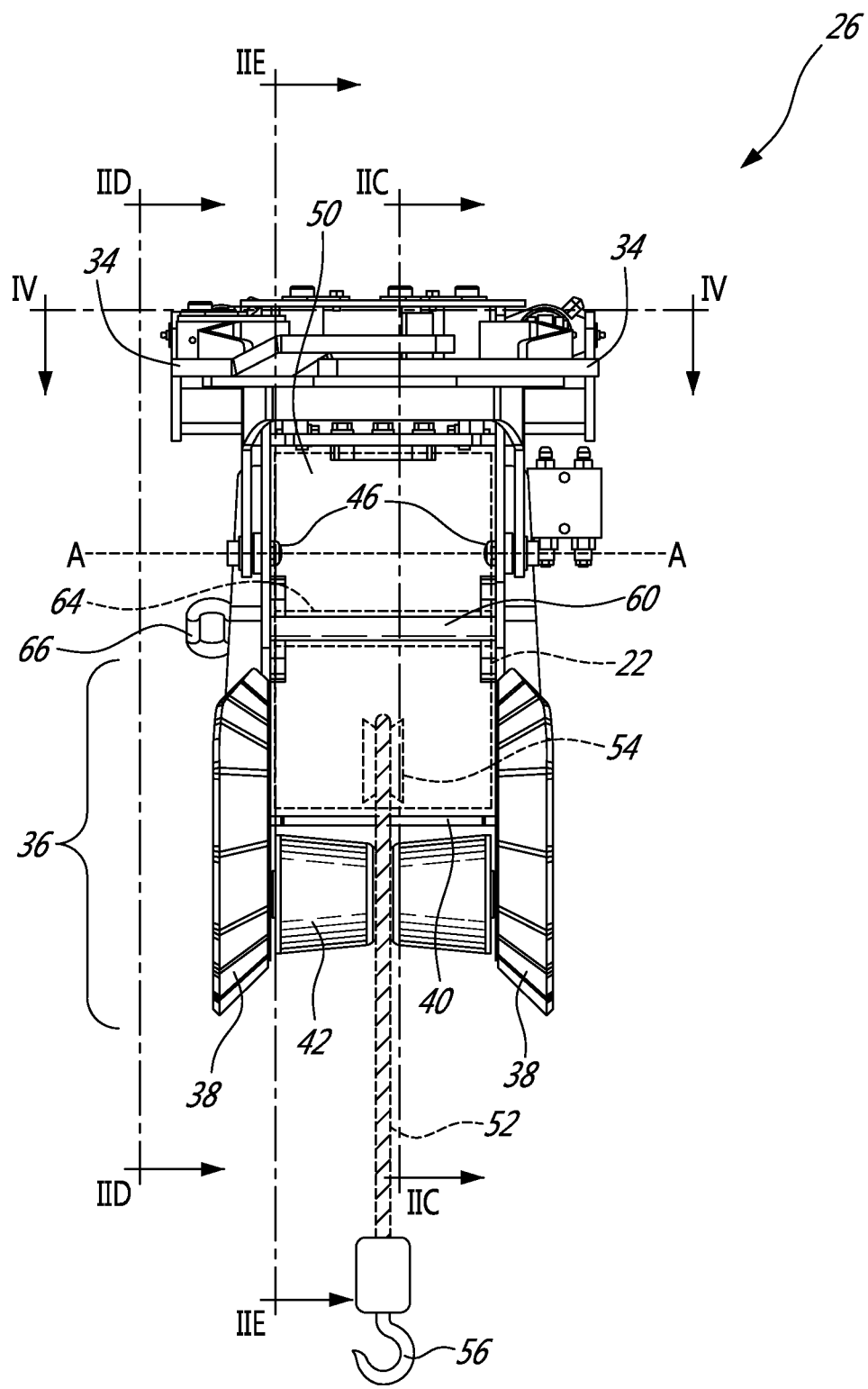
FIG. 2B is a front plan view of a pole-tilt assembly in accordance with an illustrative embodiment of the present invention.
Figure 20:
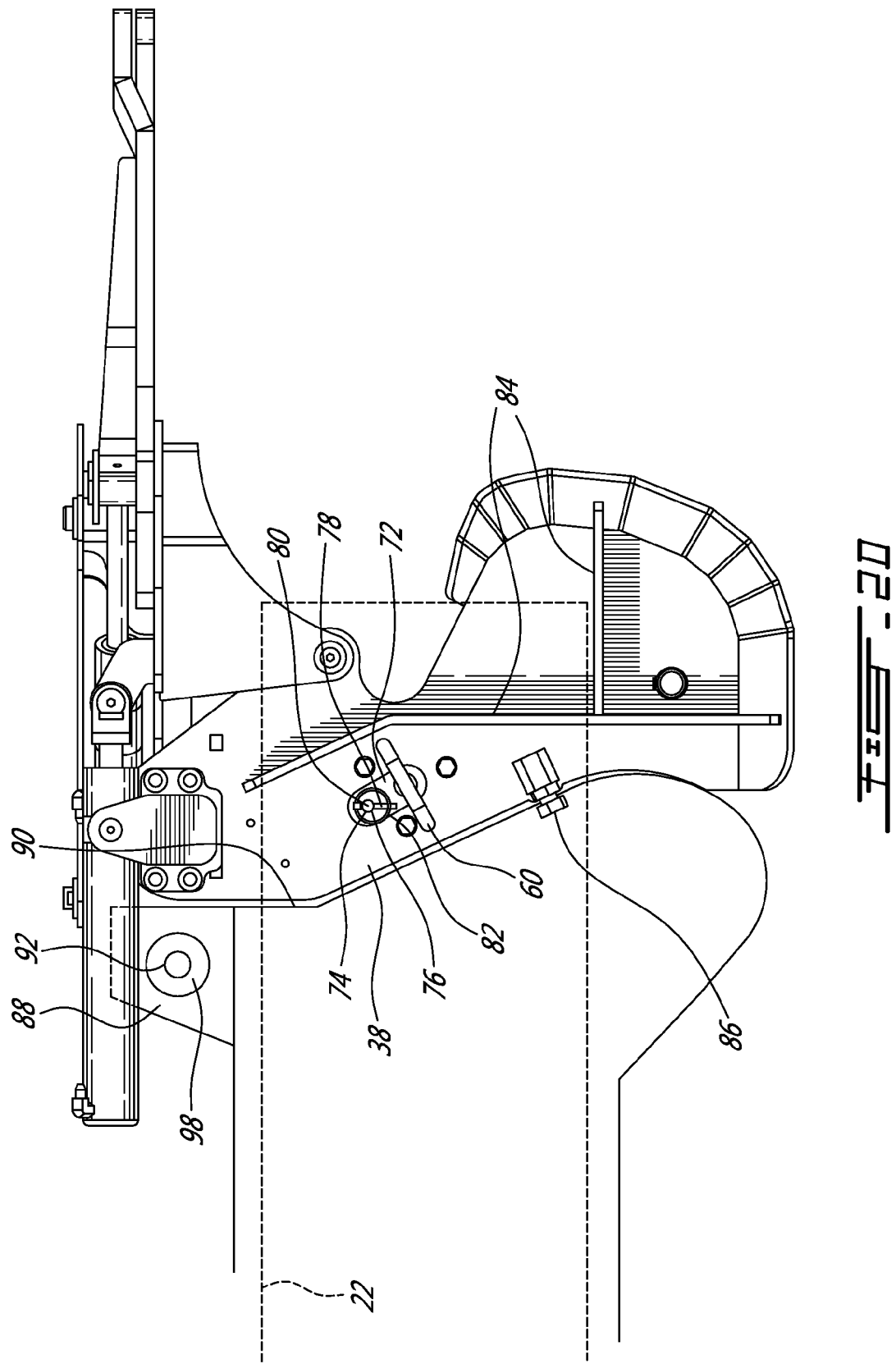

Referring to FIG. 1, a telescoping arm with pole-tilt assembly, generally referred to using the reference numeral 10, will now be described. The telescoping arm with pole-tilt assembly 10 is typically mounted at the end of a multi-section aerial boom or the like 12 which is in turn mounted to the chassis 14 of a truck or the like. The boom 12 is secured to the chassis 14 via a rotatable turret 16 which, under control of the user, may be rotated about an axis normal to the truck bed 18 for placing the telescoping arm with pole-tilt 10 in a desired position. The boom 14 may be raised or lowered under user control via a series of hydraulic pistons as in 20. Additionally, a telescoping boom section 22 may be extended from the end of the intermediate boom section 24 under control of the user and via a piston of the like (not shown). A pole-tilt assembly 26 is provided and equipped to grab and manipulate elongate objects such as a utility pole 28 or the like such that they can be positioned and secured within an excavated hole as in 30, for example. In this regard, and as will be discussed in more detail below, the user is able to tilt, or change the attitude of, the utility pole 28 or the like such that it can be better positioned within the hole 30.

Still referring to FIG. 1, the chassis 14 can include one or more extendable supporting legs as in 32 for better stabilizing the aerial boom 12 when extended. The chassis 14 also includes a hydraulic system and respective controls (not shown) for extending and retracting the pistons as in 20 and the like, and as known in the art. The hydraulic system typically is powered by the engine used to propel the chassis 14 via a power take off (PTO) or the like (also not shown). In a particular embodiment, a dedicated source of power, such as an electric motor, internal combustion engine or the like, could be used to power the hydraulics.

Referring now to FIGS. 2A and 2B, the pole-tilt assembly 26 comprises a jaw assembly comprising a pair of opposed arcuate jaws as in 34 configured for encircling the elongate utility pole (reference 28 in FIG. 1) or the like and a saddle 36 against which the pole 28 can rest. The saddle 36 comprises a pair of opposed side parts as in 38 interconnected by a brace 40 and a roller 42. The jaws as in 34 are mounted upon a table 44 which is in turn mounted to the saddle 36 via a hinge 46 which defines an axis A-A about which the table 44, and therefore the jaws 34, may pivot upon actuation of a pair of pistons 48. The pole-tilt defines a substantially square aperture 50 through which the telescoping arm 22 may selectively be extended or secured. The telescoping arm 22 is typically hollow and includes a cable 52 which runs over a pulley 54, for example for raising and lowering items secured to the end of the cable via a hook 56. The hook 56 is typically raised and lowered using a winch (reference 58 in FIG. 1) or the like positioned on a lower section of the boom. The cable can be used, for example, to draw utility poles lying on the ground or the bed of a truck into the pole-tilt assembly 26 such that they can be manipulated (see FIG. 1). The components of the pole-tilt assembly 26 are manufactured largely from a durable material such as heavy gauge steel or the like.

Referring to FIG. 2C, in addition to FIGS. 2A and 2B, in order to secure the pole-tilt assembly 26 to the end of the telescoping arm 22, a removable elongate pin 60 is provided which is inserted through a pair of apertures as in 62, one in each of the opposed side parts as in 38 and engages a complementary passageway as in 64 though the telescoping arm 22. In order to aid the user in installing and removing the pin 60, a handle 66 is provided which is secured to the end of the pin 60. When the telescoping arm 22 is fully retracted into the intermediate boom section (reference 24 on FIG. 1), bosses 68 towards the end of the telescoping arm 22 may be provided to engage with corresponding horseshoe shaped seats as in 70, attached to their respective side parts 38 using bolts or the like, which limit retraction of the telescoping arm 22 into the intermediate boom section 24 while providing improved stability of the interconnection between the telescoping arm 22 and the pole-tilt assembly 26 as well as insuring correct alignment.

Referring now to FIG. 2D, the removable elongate pin 60 further comprises a locking assembly comprising locking plate 72 advantageously adjacent the handle 66 which is used to retain the pin 60 within the aperture 62. In this regard, the locking plate 72 comprises and aperture 74 which is placed over a locking pin 76 which projects above the outer surface of the side part 38. Once in place, a linchpin 78 or the like is inserted through a transverse bore 80 in the locking pin 76, thereby securing the locking plate 72 to the flange thereby retaining the elongate pin 60 within the aperture 62. A spring clip 82 can be included with the linchpin 78 to guard against inadvertent loss of the linchpin 78.

Still referring to FIG. 2D, re-enforcing struts 84 are provided on each side part 38 to improve stability of the side part 38. Additionally, an adjustable stopper 86 is provided on each flange for ensuring that the pole-tilt assembly 26 seats correctly against the intermediate section 24 when not in use.

Still referring to FIG. 2D, with the telescoping arm 22 retracted into the intermediate section 24 the elongate pin 60 can be removed and used to secure the pole-tilt assembly 26 to the end of the intermediate section 24. In this regard, a pair of raised flanges as in 88 are provided on the upper surface of the intermediate section 24 proximate to the intermediate section's outer end 90. Referring to FIG. 2E in addition to FIG. 2D, each of the raised flanges 88 comprises an aperture 92 and is arranged to be received by a complementary raised receiving flange 94, each also comprising an aperture 96, mounted towards the rear of the pole-tilt assembly 26 and which is attached welded or otherwise secured to the side part 38. When the telescoping arm 22 is in the fully retracted position, a boss as in 98 on each of the pair of raised flanges 88 are inserted into respective complementary horseshoe shaped boss receiving seats 100 on each of the raised receiving flanges 94. The boss 98/seat 100 assembly ensures that the pole-tilt assembly 26 aligns correctly with the end of the intermediate section 24, and such that the apertures 94, 96 align. The elongate pin 60 can be retracted from the operating position by releasing the locking plate 72, thereby releasing the pole-tilt assembly 26 from the end of the telescoping arm 22, and subsequently inserted into the apertures 94, 96, thereby securing the pole-tilt assembly 26 to the outer end 90 of the intermediate boom section 24. A similar locking assembly comprising a locking pin (not shown) which engages the locking plate 72 is also provided on an outer surface of the raised flange as in 88 on the same side of the intermediate boom section 24 as the locking pin 76 on the side part 38.

Referring now to FIG. 3, with the pole-tilt assembly 26 secured in the operational position to the end of the telescoping arm 22, the pole-tilt can be used to manipulate a utility pole 28 or the like held within the arcuate jaws 34. As discussed above, the arcuate jaws 34 are pivotally mounted to an upper surface 102 of a supporting table 44 via respective bolt/bushing assemblies 104. The supporting table 44 comprises a pair of opposed legs as in 106 which are secured to the opposed side parts 38 of the saddle 36 via a pair of bolt/bushing assemblies as in 108, and which provide the hinge 46 about which the jaw assembly can articulate relative to the saddle 36.

Still referring to FIG. 3, the upper surface 102 of the table 44 is additionally interconnected to the saddle 36 via a pair of attachment arms as in 110 which are respectively connected to one of a pair of matched hydraulic pistons as in 112. The hydraulic pistons 112 are respectively connected to the hydraulic system via a control valve (both not shown) and hydraulic tubing/hoses as in 114. In this regard, the hydraulic pistons 112 can be actuated to extend or retract their respective piston rods 116 under control of the user. A person of ordinary skill in the art will now understand that extension or retraction of the piston rods 116 will cause the table 44, and therefore the arcuate jaws as in 34, to articulate (tilt) relative to the saddle 36 about the transverse hinge 46 and axis (axis A-A in FIG. 2B).

Referring now to FIG. 4, in order to open and close the arcuate jaws as in 34 under control of a user, a piston assembly 118 attached to the hydraulic system via a control valve and respective hydraulic tubing/hoses as in 120 is provided. As the piston assembly 118 is interconnected between only one of the arcuate jaws 34 and the upper surface 102 of the table 44, a gear assembly 122 comprising a series of intermeshing teeth as in 124 is provided between the pivoting ends of the arcuate jaws 34. As will now be understood by a person of ordinary skill in the art, as the piston assembly 118 is extended or retracted, a first of the arcuate jaws 34 connected to the piston assembly 118 pivots about its respective bolt/bushing assembly 104. Simultaneously, the intermeshing teeth are engaged, thereby causing the other of the arcuate jaws 34 to pivot about its respective bolt/bushing assembly 104 in a similar fashion. In order to ensure that the arcuate jaws 34 do not flex during operation, re-enforcing strips as in 126 are provided.

Referring back to FIGS. 2C and 2E, a pair of rearward facing hooks as in 128 are welded or otherwise secured to the underside 130 of the table 44. As discussed above, when the telescoping boom section 22 is retracted into the intermediate boom section 24, the elongate pin 60 can be moved from the operational to the non-operational position, thereby securing the pole-tilt assembly 26 to the end of the intermediate section 24. Prior to moving the elongate pin 60 to the non-operational position, the pole-tilt assembly 26 is tilted about the hinge 46 relative to the saddle 36 such that the pair of hooks as in 128 are also engaged by the pin when it is inserted into the apertures 94, 96. When the hooks as in 128 are engaged by the elongate pin 60, they prevent the table 46, and therefore the arcuate jaws as in 34, from being inadvertently tilted forward towards the seat 36. As the telescoping boom section 22 can be extended through the pole-tilt assembly 26 when it is in the non-operational position, provision of the hooks as in 128 engaged by the elongate pin 60 prevent damage which might otherwise occur to the telescoping boom section 22 if the arcuate jaws as in 34 would be inadvertently tilted downwards towards the saddle 36 when the telescoping boom section 22 is extended.

Although the present invention has been described hereinabove by way of specific embodiments thereof, it can be modified, without departing from the spirit and nature of the subject invention defined in the appended claims.

I claim:

1. A telescoping arm with securable pole-tilt assembly for manipulating a utility pole, comprising:
   a boom comprising an intermediate boom section and a telescoping boom section, said telescoping boom section fabricated from a non-conductive composite material and arranged for telescoping between a retracted and an extended position along a telescoping axis from within an outer end of said intermediate boom section;
   a pole-tilt assembly for receiving the utility pole along a pole axis and comprising a pole saddle and a jaw assembly comprising pair of opposed arcuate jaws each arranged to pivot about a respective axis and arranged for gripping the utility pole, said jaws positioned above said saddle along said pole axis and wherein said jaw assembly may be articulated relative to said saddle about an axis at right-angles to both said pole-axis and said telescoping axis; and
   a securing assembly comprising an elongate pin for selectively securing said pole saddle in one of either an operational position to an outer end of said telescoping boom section or in an out of operation position to said outer end of said intermediate boom section, wherein in said out of operation position said telescoping boom section is configured for extension through said pole-tilt assembly between said jaw assembly and said pole saddle between said retracted and said extended position;
   wherein in said operational position a first pair of opposed apertures in said pole saddle align with a passageway in said telescoping boom section and such that said elongate pin can be inserted and retained within said first pair of apertures and said passageway and at right angles to said telescoping axis, wherein upon insertion of said pin through said first pair of apertures and said passageway said pole-tilt assembly is secured to said outer end of said telescoping boom section for movement therewith between said retracted and said extended position and wherein said jaw assembly may be articulated relative to said saddle;
   wherein in said out of operation position a second pair of apertures in said pole saddle align with a third pair of apertures in said intermediate boom section and such that said elongate pin can be inserted and retained within said second and third pairs of apertures and at right angles to said telescoping axis, wherein upon insertion of said pin through said second and third pairs of apertures said pole-tilt assembly is secured to said outer end of said intermediate boom section, and further wherein said jaw assembly engages said pin thereby preventing said jaw assembly from being articulated downwards relative to said pole saddle.

2. The telescoping arm with securable pole-tilt assembly according to claim 1, wherein in said operational position a first pair of bosses on said telescoping boom section are received in respective ones of a complementary first pair of horseshoe shaped seats on said pole-tilt assembly and further wherein said first pair of apertures and said passage are aligned with respective ones of said bosses and said seats.

3. The telescoping arm with securable pole-tilt assembly according to claim 2, wherein in said operational position a third boss on a top of said telescoping boom section is received in an additional complementary horseshoe shaped seat on said pole-tilt assembly.

4. The telescoping arm with securable pole-tilt assembly according to claim 1, wherein in said out of operation position a second pair of bosses on said intermediate section are received in respective ones of a complementary second pair of horseshoe shaped seats on said pole-tilt assembly and further wherein said second and third pairs of apertures are aligned with said bosses and said seats.

5. The telescoping arm with securable pole-tilt assembly according to claim 1, wherein said jaw assembly comprises at least one hook and further wherein in said out of operation position, said at least one hook engages an underside of said pin thereby preventing said jaw assembly from being articulated downwards towards said pole saddle.

6. The telescoping arm with securable pole-tilt assembly according to claim 1, wherein said intermediate boom section and said telescoping boom section are both of rectangular cross section.

7. The telescoping arm with securable pole-tilt assembly according to claim 1, wherein said telescoping boom section telescopes within said intermediate boom section.

8. The telescoping arm with securable pole-tilt assembly according to claim 1, wherein said elongate pin comprises a handle at a first end and a releasable locking assembly adjacent said handle such that when said elongate pin is inserted in said first pair of apertures and said passage, said locking assembly engages and prevents said elongate pin from being retracted from said first set of apertures.

9. The telescoping arm with securable pole-tilt assembly according to claim 8, wherein said locking assembly comprises a plate member mounted to said elongate pin adjacent said handle and a locking pin mounted to said pole saddle adjacent one of said first set of apertures, wherein on insertion of said elongate pin in said first set of apertures said locking pin is received in a hole in said plate member, said locking pin further comprising a hole at distal end thereof for receiving a linchpin, wherein when installed, said linchpin retains said locking pin in said locking plate hole thereby preventing said elongate pin from being retracted from said first set of apertures.

10. The telescoping arm with securable pole-tilt assembly according to claim 1, wherein said elongate pin comprises a handle at a first end and a releasable locking assembly adjacent said handle such that when said elongate pin is inserted in said second and third pairs of apertures, said locking assembly engages and prevents said elongate pin from being retracted from said second and third pairs of apertures.

11. The telescoping arm with securable pole-tilt assembly according to claim 10, wherein said locking assembly comprises a plate member mounted to said elongate pin adjacent said handle and a locking pin mounted to said pole saddle adjacent one of said first set of apertures, wherein on insertion of said elongate pin in said first set of apertures said locking pin is received in a hole in said plate member, said locking pin further comprising a hole at distal end thereof for receiving a linchpin, wherein when installed, said linchpin retains said locking pin in said locking plate hole thereby preventing said elongate pin from being retracted from said first set of apertures.

12. The telescoping arm with securable pole-tilt assembly according to claim 1, further comprising a winch secured to said intermediate boom section, a pulley for rotating about a horizontal axis at an outer end of said telescoping boom, and a cable extending along said telescoping boom and over said pulley, wherein a hook end of said cable can be raised and lowered through selected operation of said winch.

\* \* \* \* \*